United States Patent
Herloski et al.

(10) Patent No.: US 9,869,590 B2
(45) Date of Patent: Jan. 16, 2018

(54) SPATIALLY-RESOLVED FWA SPECTROPHOTOMETER USING MICROPATTERNED OPTICAL FILTERS

(71) Applicant: XEROX CORPORATION, Norwalk, CT (US)

(72) Inventors: Robert P. Herloski, Webster, NY (US); Paul S. Bonino, Ontario, NY (US); Jason M. LeFevre, Penfield, NY (US); David C. Craig, Pittsford, NY (US)

(73) Assignee: XEROX CORPORATION, Norwalk, CT (US)

(*) Notice: Subject to any disclaimer, the term of this patent is extended or adjusted under 35 U.S.C. 154(b) by 175 days.

(21) Appl. No.: 14/725,909

(22) Filed: May 29, 2015

(65) Prior Publication Data
US 2016/0349112 A1  Dec. 1, 2016

(51) Int. Cl.
*G01J 3/42* (2006.01)
*G01J 3/02* (2006.01)
*G01J 3/10* (2006.01)
*G01J 3/28* (2006.01)
*G01J 3/36* (2006.01)
*G01J 3/51* (2006.01)
*G01J 3/12* (2006.01)

(52) U.S. Cl.
CPC .............. *G01J 3/42* (2013.01); *G01J 3/0208* (2013.01); *G01J 3/0256* (2013.01); *G01J 3/10* (2013.01); *G01J 3/2803* (2013.01); *G01J 3/36* (2013.01); *G01J 3/513* (2013.01); *G01J 2003/1213* (2013.01)

(58) Field of Classification Search
CPC .... G01J 3/42; G01J 3/10; G01J 3/0256; G01J 3/0208; G01J 3/2803; G01J 3/36; G01J 3/513; G01J 2003/1213
See application file for complete search history.

(56) References Cited

U.S. PATENT DOCUMENTS

| | | |
|---|---|---|
| 5,278,589 A | 1/1994 | Wong |
| 5,365,074 A | 11/1994 | Genovese |
| 6,351,308 B1 | 2/2002 | Mestha |
| 6,904,255 B2 | 6/2005 | Kera et al. |
| 6,975,949 B2 | 12/2005 | Mestha et al. |
| 7,177,585 B2 | 2/2007 | Matsuzaka et al. |
| 8,203,769 B2 | 6/2012 | Herloski et al. |
| 8,368,002 B2 | 2/2013 | Hosier et al. |
| 9,448,346 B2 * | 9/2016 | Ockenfuss ............ G01J 3/0256 |

(Continued)

OTHER PUBLICATIONS

Author Unknown, "Micro-Patterned Optical Filters", Retrieved from the Internet on May 29, 2015, http://a8859ac08703feae2ef0-3c64237a4c774bc090139d4dc157b552.r26.cf2.rackcdn.com/Patterned-Coatings-1.0.0.pdf, pp. 1-2.

Primary Examiner — Michael P Lapage
(74) Attorney, Agent, or Firm — MH2 Technology Law Group LLP

(57) ABSTRACT

Provided is a system for providing spectral analysis with a spectrophotometer. The system includes an illuminator positioned adjacent to a carrier having a surface; a linear sensor positioned adjacent to the carrier; and a micropatterned optical filter is positioned between the linear sensor and the carrier. The illuminator is configured to emit light at a material disposed over the surface. The linear sensor is configured to receive the light from the illuminator.

18 Claims, 8 Drawing Sheets

(56) References Cited

U.S. PATENT DOCUMENTS

| | | | |
|---|---|---|---|
| 2002/0001084 A1* | 1/2002 | Yokozawa | B41J 35/16 356/425 |
| 2002/0094484 A1* | 7/2002 | Buchsbaum | G02B 5/20 430/7 |
| 2010/0092083 A1* | 4/2010 | Herloski | G01J 3/02 382/168 |
| 2012/0021539 A1 | 1/2012 | Allenic et al. | |
| 2013/0095577 A1 | 4/2013 | Milshtein | |
| 2015/0045636 A1* | 2/2015 | Novotny | G01J 3/42 600/316 |
| 2015/0203966 A1 | 7/2015 | Budiarto et al. | |

* cited by examiner

SPATIALLY-RESOLVED FWA SPECTROPHOTOMETER USING MICROPATTERNED OPTICAL FILTERS

FIELD

The present disclosure relates to a system for providing analysis of a deposited material, such as thickness and color monitoring on a substrate surface with a spectrophotometer.

BACKGROUND

In high end printing or publishing systems, spectrophotometers are used to characterize the quality of the color output of the system, and to provide a mechanism to adjust the color output characteristics of the system. In many such systems the spectrophotometer is an off-line device, in which a print from the system is carried to the spectrophotometer for measurement. For ease of use and integration, it is often desired to have the spectrophotometer inline to the print path, so that sheets or media are scanned automatically, with little or no user interaction. Current prior art inline spectrophotometers (ILS) are relatively expensive and require extensive calibration techniques.

It would be desirable to provide a compact, low cost, spectrophotometer for in-line color output and/or thickness measurements.

SUMMARY

In an embodiment there is a system for providing spectral analysis with a spectrophotometer. The system includes an illuminator positioned adjacent to a carrier having a surface; a linear sensor positioned adjacent to the carrier; and a micropatterned optical filter is positioned between the linear sensor and the carrier. The illuminator is configured to emit light at a material disposed over the surface. The linear sensor is configured to receive the light from the illuminator.

In another embodiment, there is a method for providing spectral analysis with a spectrophotometer. The method includes configuring an illuminator to emit a light beam at a material disposed over a surface of a carrier, and configuring a linear sensor to receive the light emitted from the illuminator and at least partially transmitted through a micropatterned optical filter. The illuminator is positioned adjacent to the carrier. The linear sensor is positioned adjacent to the carrier's surface. The micropatterned optical filter is disposed between the linear sensor and the carrier.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

The filter may be a micropatterned filter on a three- or four-row sensor to get spatially resolved spectrophotometric data.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

As used herein, unless otherwise specified, the word "printer" encompasses any apparatus that performs a print outputting function for any purpose, such as a digital copier, bookmaking machine, facsimile machine, a multi-function machine, electrostatographic device, etc. It will be understood that the structures depicted in the figures may include additional features not depicted for simplicity, while depicted structures may be removed or modified.

Figure 1:
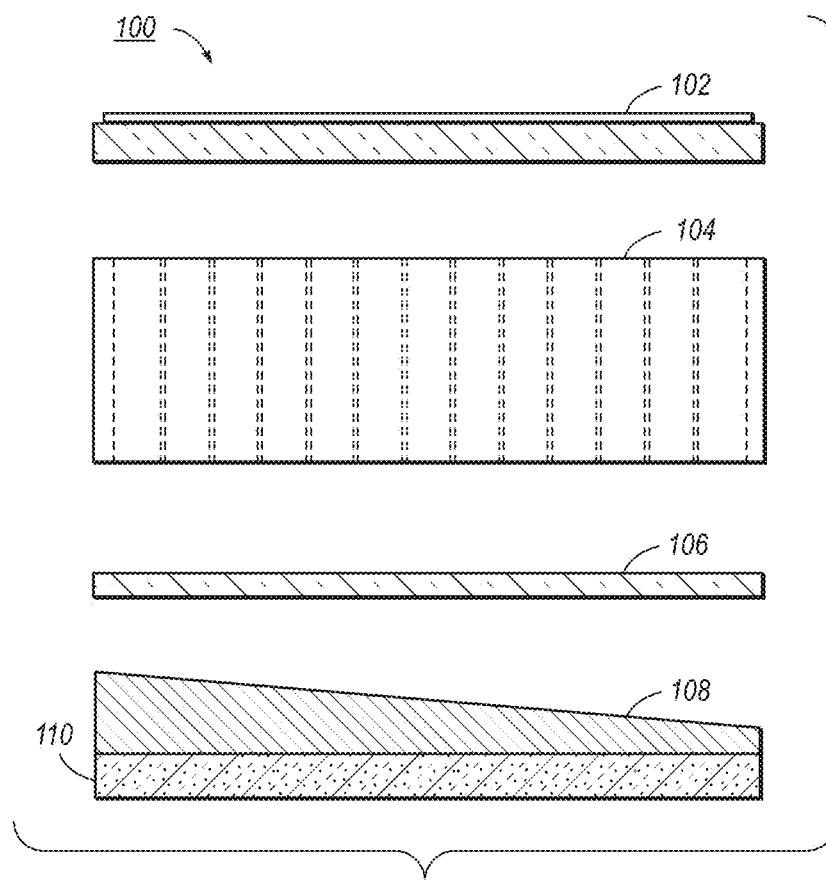
FIG. 1 shows a related art system for determing the spectral transmittance of samples with a spectrophotometer.

FIG. 1 shows a prior art system 100 that is used for determining the spectral transmittance of samples with a spectrophotometer. The system 100 includes test sample 102, an illuminator (not shown), a self-focusing lens array (e.g., SELFOC® lens array) 104, a collimating lens 106, a linear variable filter 108, and a linear sensor 110. The illuminator emits light beams at the test sample 102, and the light beams reflecting off or transmitted through the test sample 102 are received and analyzed by the linear sensor 110. The light beams reflecting off or transmitted through the test sample 102 are received by the linear sensor 110 via the SELFOC® lens array 104, the collimating lens 106, and the linear variable filter 108. The effect of effectively broadening the nominal bandpass characteristics of the linear variable filter is eliminated by collimating the light beams (i.e., reflecting off the test sample 102) entering the linear variable filter 108 and the linear sensor 110. The light beams (i.e., reflecting off or transmitted through the test sample 102) are collimated by using the collimating lens 106 positioned in between the SELFOC® lens array 104 and the linear variable filter 108.

Figure 2A:
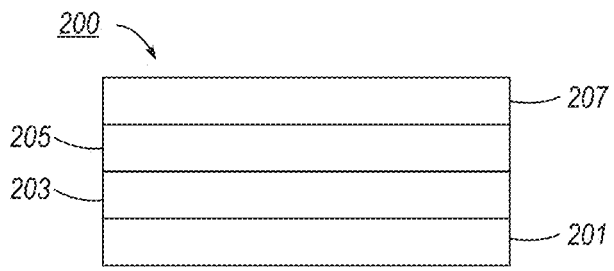
FIG. 2A depicts a cross-sectional view of a micropatterned optical filter that comprises a plurality of layers configured to providing a predetermined spectral transmittance.

In contrast, the present disclosure proposes a system for providing color and/or thickness analysis of an object, such as a toner image, on a substrate, such as an image bearing surface, with a spectrophotometer. The system of the present disclosure is devoid of a linear variable filter, and instead uses a micropatterned optical filter, such as a micropatterned optical filter 200 of FIG. 2A. That is, the present disclosure proposes at least one micropatterned optical filter 200 disposed on the linear sensor as described further below. The present disclosure proposes a micropatterned optical filter disposed over the linear sensor. In one embodiment, the micropatterned optical filter is adjacent to the sensor, for example, disposed directly on a light receiving portion of the sensor. In addition, the angular spread of light imaged by the gradient index lens (e.g., Selfoc® lens) is also maintained small, thus, the effect of effectively broadening the nominal bandpass characteristics of the micropatterned optical filter is acceptable.

In one embodiment, micropatterned optical filter 200 includes at least one material that may be arranged to provide a predetermined spectral transmittance. For example, the at least one material may include at least one layer, such as coating 201, but may include more than one layer/coating that may be the same or different than coating 201. For example, coating 201 may define a first coating and the micropatterned optical filter may include additional coatings that are identical to or different than coating 201. For simplicity, the additional coatings here are shown and described as second coating 203, third coating 205 and fourth coating 207. The coatings 201, 203, 205 and 207 may be stacked one over the other. The micropatterned optical filter may include any number of coatings, including an $n^{th}$ coating, where n is the total number of coatings. Each of the one or more coatings, including coating 201, second coating 203, third coating 205, fourth coating 207 and/or the $n^{th}$ coating may include one or more of a dielectric (i.e., dichroic coating), a metal coating or any conductive coating and may be disposed over a substrate (not shown). Each of the coatings 201, 203, 204, 207 may include a shape, including lines, dots, pixels, and/or may include apertures.

Figure 2B:
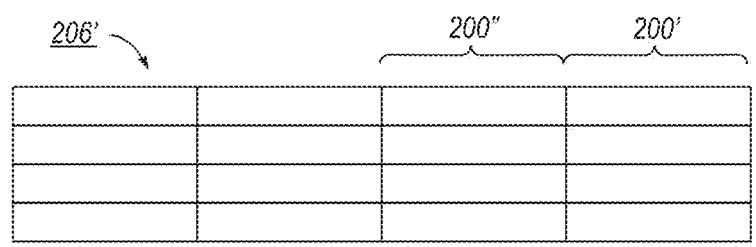
FIG. 2B depicts a cross-sectional view of a plurality of micropatterned optical filters arranged in a row adjacent to one another, such as in a horizontal bar configuration.
Figure 2C:
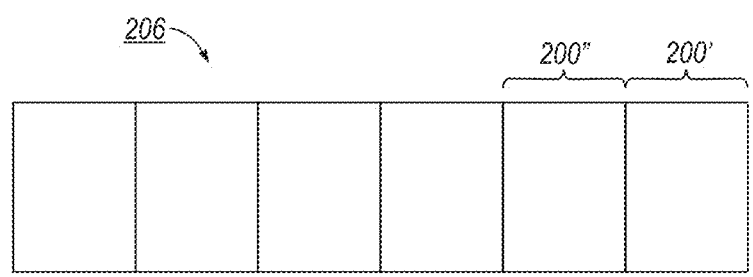
FIG. 2C depicts a simplified view of the cross-section of miropatterned optical filters arranged as in FIG. 2B.

As shown in FIG. 2B, a micropatterned optical filter 206' may be arranged as a plurality of individualized filters 200', 200". This arrangement allows for individual pixels of a sensor, such as an FWA chip, to be coated with a corresponding one of individualized micropatterned filter. Each of the plurality of individualized filters 200', 200" may be configured according to the description of micropatterned optical filter 200 of FIG. 2A, including each having one or more coatings that may be configured so as to provide a predetermined optical transmittance. In an embodiment, the individualized filters 200', 200" in the micropatterned optical filter 206' may be identical or different from one another. That is, individualized micropatterned filter 200' may be configured to provide a first spectral transmittance and micropatterned filter 200" may be configured to provide a second spectral transmittance, wherein the first spectral transmittance and second spectral transmittance are substantially similar to one another or are different than one another. The plurality of individualized micropatterned optical filters, for example filters 200' & 200", may be arranged next to one another, such as adjacent to one another, including on a single substrate, to provide a respective one of a predetermined spectral transmittance to an underlying corresponding one of a pixel of the sensor. The individualized micropatterned optical filters 200', 200" may be separated from one another by at least one intervening layer, which may include a spacer layer. FIG. 2C shows a simplified cross-sectional view of a micropatterned optical filter 206 which may have the same or different features than micropatterned optical filter 206'. The micropatterned optical filter may further include IR blockers, UV blockers and antireflective (AR) coatings.

Suitable micropatterned optical filter of this type which are used in the present disclosure are available from Pixelteq, Inc. (Largo, Fla.). The properties or specifications of a non-limiting example of such a micro-patterned optical filter are disclosed as follows: The spectral range of the micropatterned optical filter is 250 nm to 2500 nm, for example about 400 nm to about 700 nm.

As discussed above, the micropatterned optical filter may be disposed on the linear sensor. The micropatterned optical filter is configured as at least one layer that may be arranged to provide a predetermined spectral transmittance, and may be arranged as a plurality of individualized filters for providing light at the predetermined spectral transmittance to an underlying one of a corresponding pixel of the sensor. In other words, in one embodiment, the linear sensor comprises a plurality of sensor pixels, the micropatterned optical filter comprises a plurality of individualized micropatterned filters, and at least one of plurality of individualized filters is disposed over a corresponding one of the plurality of sensor pixels. Additionally, each of individualized micropatterned filters may comprise a center wavelength and, because the micropatterned optical filter may be arranged as a plurality of individualized filters with each individualized filter formed above a corresponding pixel of a sensor, the individualized micropatterned filters may be arranged randomly such that the center wavelengths are arranged randomly over the underlying sensor. Accordingly, the configuration of the micropatterned optical filter is such that there is no need to continuously vary a center wavelength as is the case with a linear variable filter.

Figure 3A:
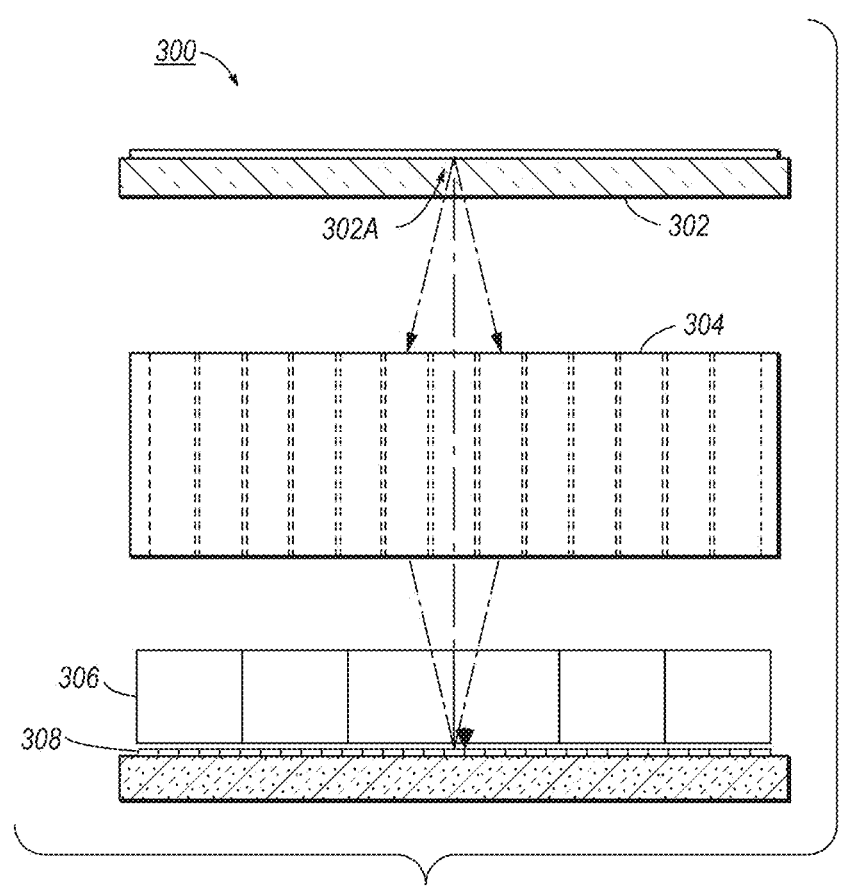
FIGS. 3A-3B show different views of a system for providing spectral analysis of a material on substrate surface with a spectrophotometer in accordance with an embodiment of the present disclosure.
Figure 3B:
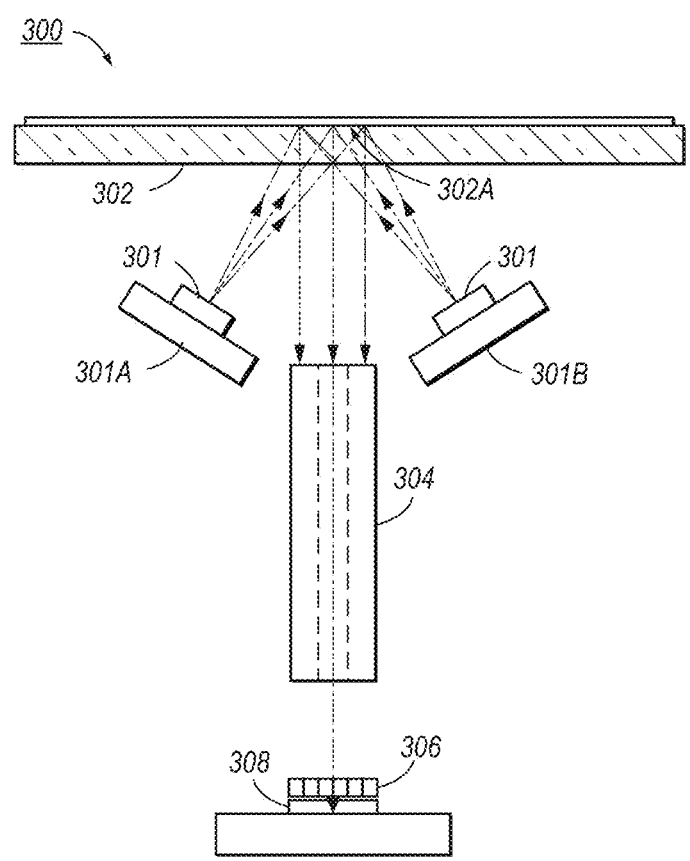
Figure 3C:
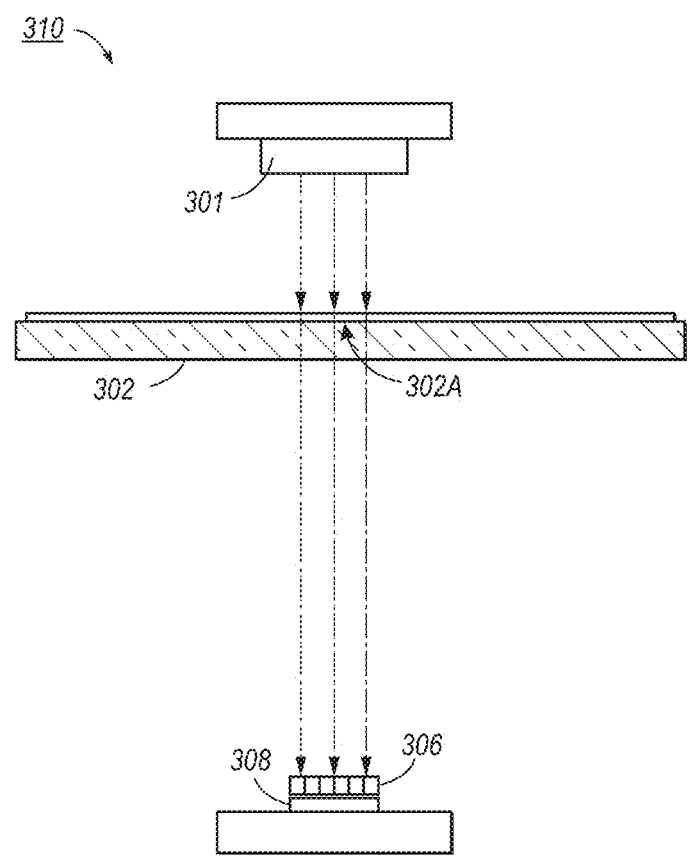
FIG. 3C is a view of an alternate system for providing spectral analysis of a material on substrate surface with a spectrophotometer in accordance with an embodiment of the present disclosure.

As shown in FIGS. 3A-3C, systems 300 and 310 of the present disclosure include an illuminator 301. In FIG. 3B, the illuminator 301 is positioned adjacent to a carrier having a surface 302, the illuminator being configured to emit light at a material 302A disposed over the surface. In FIG. 3C, the illuminator 301 is positioned adjacent to a carrier having a surface 302, the illuminator being configured to emit light through a material 302A disposed over the surface. The systems 300 and 310 also include a linear sensor 308 positioned adjacent to the carrier, such as adjacent to the carrier surface 302. The linear sensor may be configured to receive the light from the illuminator, such as light reflected by (as in FIG. 3B) or transmitted through (as in FIG. 3C) one or more of the carrier, the carrier's surface 302, and the material 302A. System 300 also includes a gradient index lens 304 placed in the optical path of the light beams reflected by surface 302, and a micropatterned optical filter 306 placed in the optical path of the light beams reflecting off the substrate surface 302. Meanwhile, system 300 also includes a micropatterned optical filter 306 placed in the optical path of the light transmitted through one or more of the carrier, the carrier's surface 302, and the material 302A. In an embodiment, the micropatterned optical filter 306 is disposed over the linear sensor 308, and may be disposed on a light receiving portion of the linear sensor 308.

The illuminator 301 is configured to emit a light beam at material 302A, such as a print, for example, a toner image or other coating, disposed on carrier surface 302. In an example, the material 302A may be deposited onto the carrier via a print system. Accordingly, material 302A may be toner forming a toner image, or ink forming an ink image. The material 302A may completely or partially coat an underlying carrier. Material 302A may be at least partially transparent to light emitted by the illuminator. Exemplary carriers include paper, polymer based carriers, or any carrier material that is adapted for receiving toner or printer ink such that the toner or printer ink may form a printed image.

The linear sensor 308 is configured to receive the light beams reflecting off and/or transmitting through the material 302A on the carrier 302. As shown for system 300 in FIG. 3B, the light beams reflecting off the material 302A on the image bearing surface 302 are directed to the linear sensor 308 by the gradient index lens 304 and via the micropatterned optical filter 306. The gradient index lens 304 is positioned in between the substrate surface 302 and the micropatterned optical filter 306. The micropatterned optical filter 306 is positioned between the linear sensor 308 and the gradient index lens 304. As shown for system 310 in FIG. 3C, the light beams transmitting through the material 302A on the carrier surface 302 are directed to the linear sensor 308 via the micropatterned optical filter 306. In an embodiment, the liner sensor and micropatterned optical filter 306 may be positioned close to the carrier, such as to be configured for contact image sensing. Additionally an imaging lens, such as a SELFOC® lens may be positioned between the sensor 308 and the carrier.

Figure 3D:
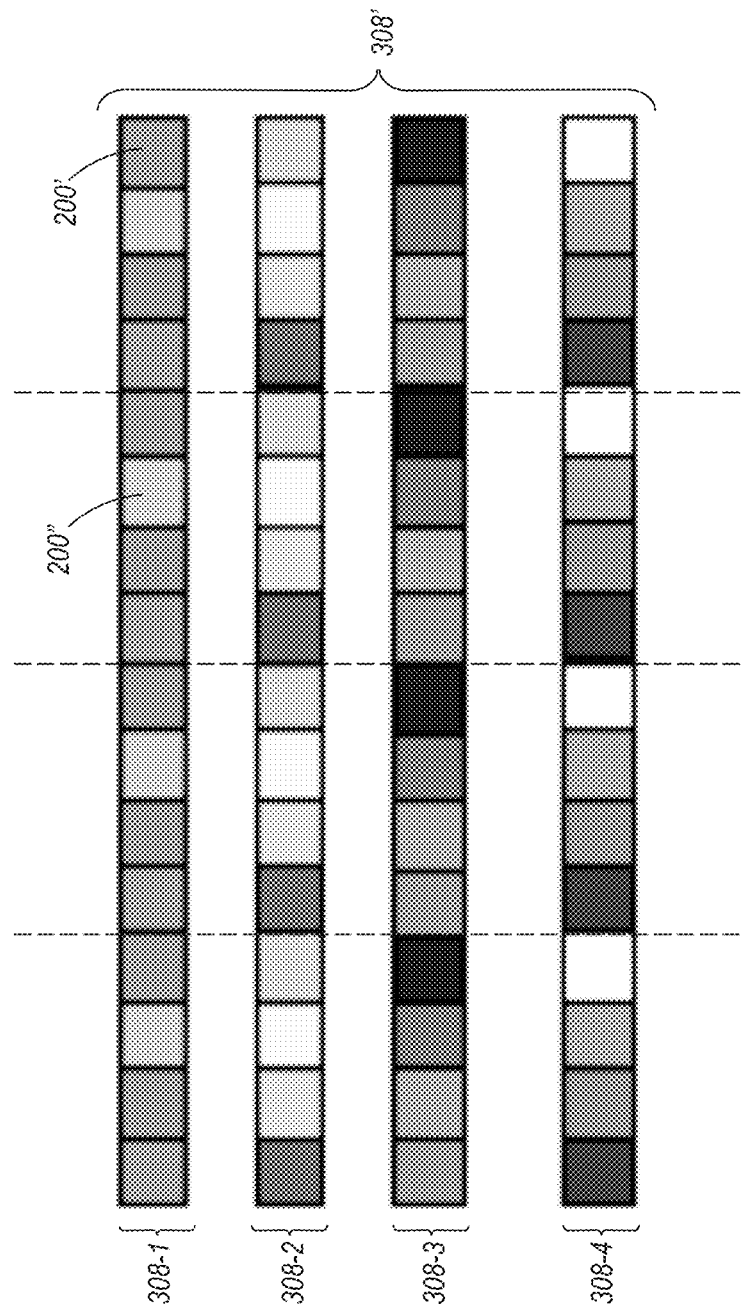
FIG. 3D is a schematic diagram of a portion of a sensor array arranged in a 4×4 arrangement. The micropatterned optical filter may be disposed over one or more pixels of each row of sensors.

The linear sensor 308 may include a sensor array configured to obtain measurements of M≥4 different spectral sensitivity responses per output pixel at low resolution to obtain spectrophotometric data representing a plurality of output pixels representing the image-bearing surface, which may be used by at least one electronic processor to determine high-resolution RGB data representing the image-bearing surface. The sensor array might include a plurality of groups of 2×4 sensor elements. The sensor array might include a plurality of groups of 2×2 sensor elements. The low resolution might be 300×600 dots per inch (dpi). The high-resolution might be 600 dots per inch (dpi). Each output pixel might include data obtained by at least four sensor elements. In some embodiments, sensor 308 comprises a sensor array 308'. FIG. 3D is a schematic diagram showing a top view of a portion of sensor array 308' configured in a 4×4 arrangement. Sensor array 308' might be a full width array (FWA), for example. Note that sensor array 308' is characterized as "4×4" because it comprises repeating array units of four columns of four rows, each row in FIG. 3D designated by 308-1, 308-2, 308-3 and 308-4 and each column separated by one of the superimposed vertical dashed lines illustrated in FIG. 3D. A full width array might be a sensor that extends, by repetition of such array units, substantially an entire width (perpendicular to a direction of motion) of a moving substrate surface. Thus, the portion of sensor array 308' depicted in FIG. 3D is partial; in an embodiment, sensor array 308' might extend to the left and/or right by the inclusion of additional array units, such that it extends substantially the entire width of a cross-process direction. In some embodiments, sensor array 308' might include a plurality of sensor elements, depicted in FIG. 3D as squares, equally spaced at intervals (e.g., every 1/600th inch for 600 dpi) in the cross-process (or fast scan) direction. Sensor array 308' might include or be included on a sensor chip.

Physically, each square of input pixel array 308' shown in FIG. 3D represents a single sensor element configured to obtain a particular spectral sensitivity response value representing a portion of an image-bearing surface. This is represented in FIG. 3D using different shading for different sensor spectral sensitivities. Each linear sensor of a sensor element of sensor array 308' might include, by way of non-limiting example, a contact image sensor, an element of a CMOS array of sensors, or an element of a charge-coupled device (CCD) array of sensors. Further, each square represents a sensor element that includes a physical configuration of a spectral filter and a linear sensor. For example, each sensor element may include an individual pixel over which an individual micropatterned optical filter, such as 200" and 200' as described above, may be disposed. Thus, in an example a 4 row 600 dpa FWA chip could be coated with bandpass filters in a 4×4 block configuration to provide 16 spectra measurements at a resolution of 150 dpi. Alternatively, an 8×4 configuration provides 32 spectral measurements at 75 dpi.

Each sensor element of sensor array 308' produces an output voltage representing a spectral sensitivity response. The spectral sensitivity response might be conceptualized and represented as a mathematical overlap integral of four terms, namely, a spectral reflectivity of a respective portion of the image-bearing surface, a transmission profile of the respective spectral filter, a wavelength profile of a respective spectral illumination element, and a responsivity of the unfiltered sensor of the sensor element.

The carrier with surface 302 may be part of a printing system, such as a continuous feed or roll to roll arrangement, on which material is deposited, the color and/or thickness of which must be monitored in line in order to adjust system parameters, including amount of material deposited, processing speeds, and the like. Such printing systems generally have two important dimensions: a process (or slow scan) direction and a cross-process (or fast scan) direction. The direction in which the substrate surface moves is referred to as process (or slow scan) direction, and the direction in which the plurality of sensors are oriented is referred to as cross-process (or fast scan) direction. The cross-process (or fast scan) direction is generally perpendicular to the process (or slow scan) direction.

In one embodiment the carrier's surface 302 may be an image bearing surface of an image printing system selected from the group consisting of a photoreceptor drum, a photoreceptor belt, an intermediate transfer belt, and an intermediate transfer drum. That is, the term image bearing surface means any surface on which a toner image is received, and this may be an intermediate surface (i.e., a drum or belt on which a toner image is formed prior to transfer to the printed document). For example, a "tandem" xerographic color printing systems (e.g., U.S. Pat. Nos. 5,278,589; 5,365,074; 6,904,255 and 7,177,585, each of which are incorporated by reference), typically include plural print engines transferring respective colors sequentially to an intermediate image transfer surface (e.g., belt or drum) and then to the final substrate. Accordingly, in one embodiment, the material 302A being imaged is a uniformly colored patch, for example, on a document of interest, where the document to be scanned is illuminated by the illuminator 301.

Alternatively, in another embodiment, the carrier's surface 302 may be web surface, such as the web from which belt photoreceptors are manufactured, wherein each layer of the belt photoreceptor is deposited on the web while the web is in motion. Accordingly, material 302A may be one or more of the layers that make up the photoreceptor and are deposited on the carrier during manufacturing. Thus, the carrier may be a web which may includes polymeric materials. Accordingly, in one embodiment, the material 302A being imaged is a layer of a photoreceptor drum, for example, on a web, where the web being scanned with film deposited thereon is illuminated by the illuminator 301.

The carrier may partially or fully transmit a portion of the light emitted by the illuminator, or may partially or fully reflect the light emitted by the illuminator.

The carrier may be caused to move in a process direction by a feeder (not shown) of a system that deposits material on the carrier, for example a print system. Accordingly, the linear sensor 308 may be configured to capture spectral response in a process, cross-process or both the process and cross-process directions.

The illuminator 301 may be an array of light emitting diodes (LEDs) or any other suitable illuminator (e.g., a fluorescent light source). For example, as shown in the illustrated embodiment in FIG. 3B, the illuminator 301 may include two linear LED arrays 301A, 301B, one on each side of the gradient index lens 304 and the linear sensor 308. In another embodiment, the illuminator 301 may include a single linear LED array. In yet another embodiment, an LED array on one side and a reflective mirror on the other side may be used instead of two linear LED arrays. The LED arrays could be all one color, e.g., white or of multiple colors, as described in U.S. Pat. No. 6,975,949, incorporated herein by reference. The illuminator arrays 301A and 301B may include a plurality of discrete illuminator elements that are spaced in a linear arrangement. Preferably, the illuminator elements are LEDs that are equally spaced at regular intervals. In one embodiment, light guides or lens arrangements may be used to transfer light from LEDs to the material 302A. Each of the LEDs may be strobed such that only one color or range of wavelengths, may be emitted by the illuminator at any given time. That is, a controller may control the illuminator such as to alternate between different colored LEDs.

The gradient index lens 304 is positioned in between the carrier's surface 302 and the micropatterned optical filter 306. In one embodiment, the gradient index lens 304 may be used to perpendicularly image the material 302A on the image carrier's surface 302 onto the linear sensor 308. In one embodiment, the gradient index lens 304 is a SELFOC® lens or other micro lens arrangement with a predetermined acceptance angle α. A SELFOC® lens is a gradient index lens which consists of fiber rods with parabolic index profile. In one embodiment, the SELFOC® lens has an acceptance angle α of about +/−9 degrees.

Referring back to FIGS. 3A and 3B, in one embodiment, the linear sensor 308 is, for example, a full width array (FWA) sensor. A full width array sensor is defined as a sensor that extends substantially an entire width (perpendicular to a direction of motion) of the moving image bearing surface. The full width array sensor is configured to detect any desired part of the film(s) deposited on the substrate surface, while depositing the film(s). The full width array sensor may include a plurality of sensors equally spaced at intervals (e.g., every 1/600th inch (600 spots per inch)) in the cross-process (or fast scan) direction. See for example, U.S. Pat. No. 6,975,949, incorporated herein by reference. It is understood that other linear array sensors may also be used, such as contact image sensors, CMOS array sensors or CCD array sensors.

It is contemplated that the present disclosure may use a sensor chip, which is significantly smaller than the width of the substrate surface. The sensor chip is configured to detect only a portion of deposited films on the substrate surface, and not the entire width of the deposited films.

In one embodiment, the systems 300 and/or 310 of the present disclosure may be a spatially-resolve spectrophotometer for performing spatially-resolved measurements, or a spot or patch spectrophotometer for performing spot measurements. FIG. 3A shows a spot sensor architecture in which the linear sensor is a single chip sensor. In the spot sensor architecture, the chip sensor includes a single row, where the row includes M number of pixels.

It is contemplated that the present disclosure may also be used for a page width spatially resolved spectral imaging. In such an embodiment, the full-width array sensor includes N number of rows, where each row of the full-width array sensor corresponds to each color of the colored patch. Each of the rows includes M number of pixels.

In one embodiment, when used with illumination from the illuminator, the output of the linear sensor will indicate the reflectivity across the spectrum. In one embodiment, a processor may be provided to both calibrate the linear sensor and to process the spectral response data detected by the linear sensor. It could be dedicated hardware like ASICs or FPGAs, software, or a combination of dedicated hardware and software.

The processor may be configured, for example, to execute instructions in order to: i) determine color performance of an image printing system based on spectral response of the material received by the linear sensor, ii) adjust color performance of the image printing system based on spectral response of the material received by the linear sensor, or iii) both i and ii.

The processor may be configured, for example, to execute instructions in order to: i) determine deposition performance of a material deposition system based on spectral response of the material received by the linear sensor, ii) adjust deposition performance of the material deposition system based on spectral response of the material received by the linear sensor, or iii) both i and ii. For example, the processor may be configured to execute instructions to adjust adjust spatial toner response curves (TRCs), adjust a material jetting rate, turning one or more jets of an inkjet printhead on/off, and/or adjust a carrier feed rate.

Referring to FIGS. 3A and 3B, in one embodiment, as noted above, the material 302A being imaged is a uniform film. In one embodiment, different portions of the material 302A are imaged to different pixels of the linear sensor 308. In one embodiment, an individual micropatterned optical filter may be located above a corresponding pixel of the linear sensor 308. Thus, each pixel of the linear sensor 308 responds to light that only falls within the bandpass of the corresponding individual micropatterned optical filter formed above each respective pixel. The collection of pixel outputs, thus, represent the spectral content of the material 302A, including the contribution from the illumination. In one embodiment, calibration techniques may be used later to separate out the illumination contribution, thus, leaving just the spectral reflectance information of the material 302A.

The light beams reflecting off the material 302A are imaged by the gradient index lens 304 onto the linear sensor 308. If the micropatterned optical filter is placed over the linear sensor, such as on a light-receiving surface of the linear sensor, the pixel outputs from the linear sensor will correspond to light beams that have been wavelength-filtered by the corresponding one of the individual micropatterned optical filter. For example, assuming the spectral range of the micropatterned optical filter is 400 nanometers to 700 nanometers, the output of pixel #1 of the linear sensor corresponds to the amount of light at a first spectral transmittance within that range, and the output of pixel #n of the linear sensor corresponds to the amount of light at a second spectral transmittance also within that range.

The present disclosure, provides a sensing system that images deposited films onto the micropatterned optical filter and linear sensor assembly, where the pixel output of the sensing system will correspond to the relative spectral reflectivity of the deposited film, which can then be used to determine and influence the color performance, and/or deposition parameters (e.g., thickness of deposited film) of the image printing system. As noted above, the concept discussed in the present disclosure may be used for both spot measurement as well as page width spatially resolved spectral imaging. The micropatterned optical filter placed between a linear sensor and a gradient index lens creates a compact, low cost, spectrophotometer for in-line color output and/or thickness output print measurement. One of the advantages of the present disclosure is to provide a spectrophotometer for in-line color output and/or thickness output print measurement, the spectrophotometer having a much lower cost compared to other alternatives of inline spectrophotometers.

Figure 4:
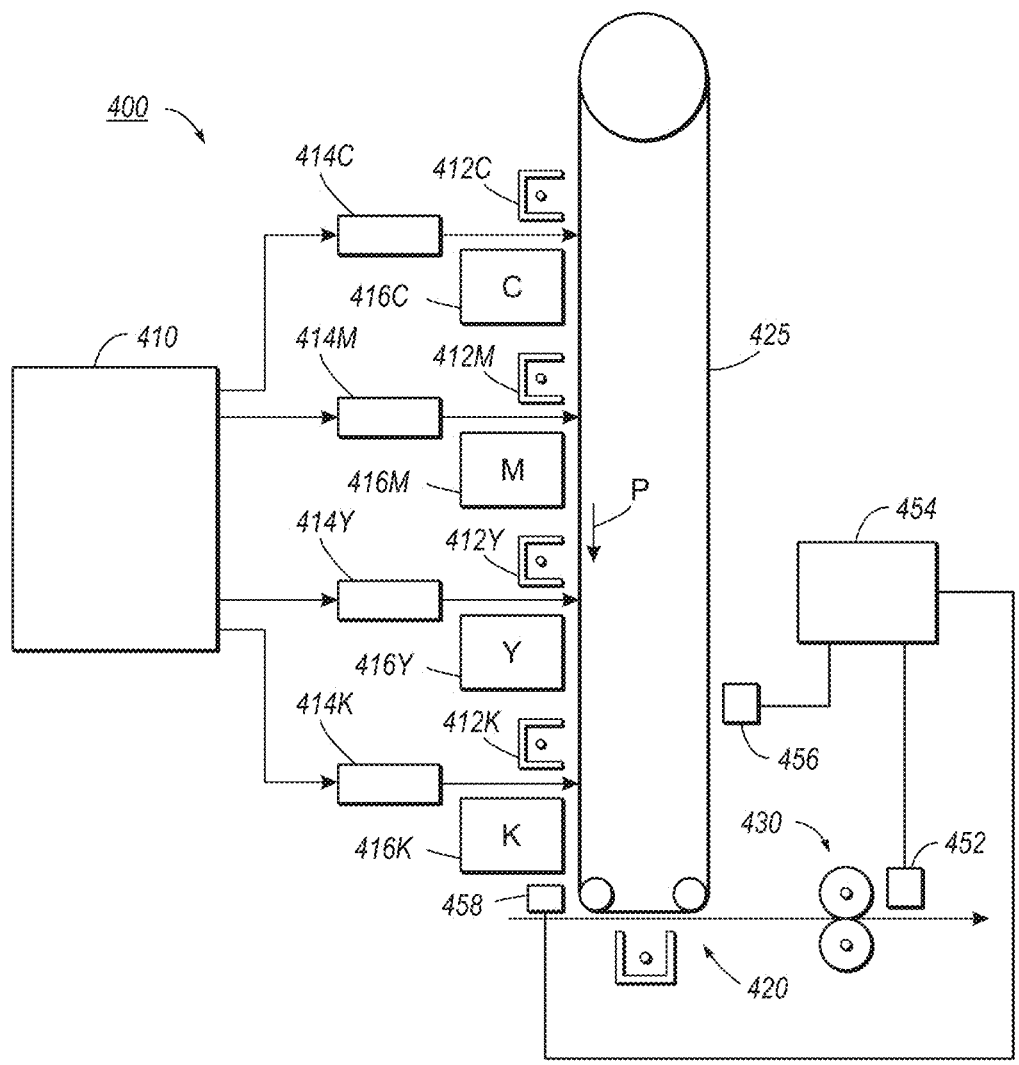
FIG. 4 is a simplified elevational view of basic elements of a an image printing system showing a context of the various embodiments.

FIG. 4 is a simplified elevational view of basic elements of an image printing system, showing a context of the present disclosure. Specifically, there is shown an "image-on-image" xerographic color printer, in which successive primary-color images are accumulated on an image bearing surface (e.g., photoreceptor belt), and the accumulated superimposed images are in one step directly transferred to an output sheet as a full-color image. In one implementation, the Xerox® iGen3® digital printing press may be utilized. However, it is appreciated that any image printing system, such as monochrome machines using any technology, machines which print on photosensitive substrates, xerographic machines with multiple photoreceptors, or ink-jet-based machines, can beneficially utilize the present disclosure as well.

Specifically, the FIG. 4 embodiment includes an image bearing surface 425 (e.g., belt photoreceptor), along which are disposed a series of stations, as is generally familiar in the art of xerography, one set for each primary color to be printed. For instance, to place a cyan color separation image on the image bearing surface 425, there is used a charge corotron 412C, an imaging laser 414C, and a development unit 416C. For successive color separations, there is provided equivalent elements 412M, 414M, 416M (for magenta), 412Y, 414Y, 416Y (for yellow), and 412K, 414K, 416K (for black). The successive color separations are built up in a superimposed manner on the surface of the image bearing surface 425, and then the combined full-color image is transferred at transfer station 420 to an output sheet. The output sheet is then run through a fuser 430, as is familiar in xerography. Printing process may be controlled, for example, by a print controller 410.

As is familiar in the art of "laser printing," by coordinating the modulation of the various lasers with the motion of the image bearing surface 425 and other hardware (such as rotating mirrors, etc., not shown), the lasers discharge areas on the image bearing surface 425 to create the desired printing, particularly after these areas are developed by their respective development units 416C, 416M, 416Y, 416K.

In one embodiment, the sensing system 300 or sensing system 310 of the present disclosure (as shown in FIGS. 3A and 3B) may be placed in the image printing system to directly monitor printed images as they exit the device, for example, at location 452. In another embodiment, the sensing system 300 of the present disclosure (as shown in FIGS. 3A and 3B) or sensing system 310 (as shown in FIG. 3C) can be placed just before or just after the transfer station 420 where the toner is transferred to the sheet or media, for example, at locations 456, 458 for monitoring images directly on the image bearing surface or other intermediate transfer members. The sensing systems 300 and/or 310 of the present disclosure can make measurements of toner images created on the image bearing surface 425 (such as sensing devices 456 and 458) or to printed images which were transferred to an output sheet (such as sensing device 452). There may be provided any number of sensing device placed anywhere in the printer as needed, not only in the locations illustrated.

The sensing devices 452, 456 and 458 provide feedback to a control device 454 for taking action in response to critical measurements taken. The information gathered therefrom is used by control device 454 and/or the print controller 410 in various ways to aid in the operation of the printer, whether in a real-time feedback loop, an offline calibration process, a registration system, etc. While the control device 454 and controller 410 are shown in the figure as being separate elements, it will be appreciated that in some implementations, the control device 454 may be a part of the print controller 410.

Figure 5:
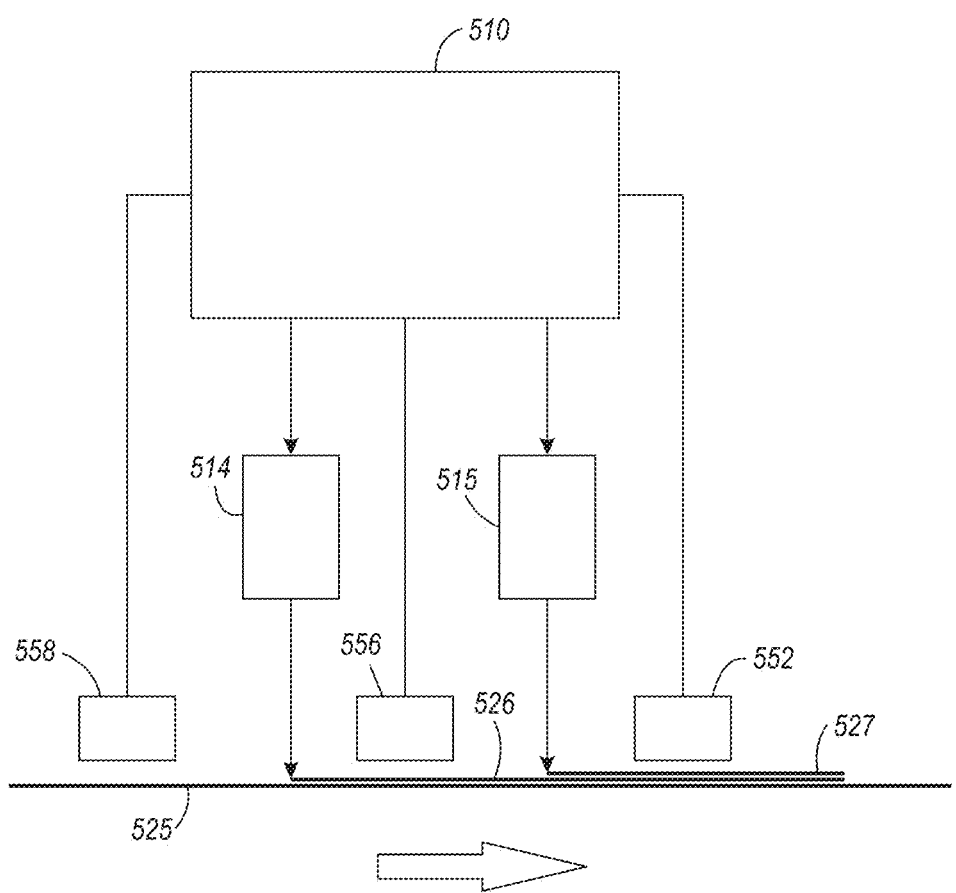
FIG. 5 is a simplified elevational view of basic elements of a material deposition system, showing a context of the various embodiments.

FIG. 5 is a simplified elevational view of basic elements of a film deposition system, showing a context of the present disclosure. Specifically, there is shown a continuous feed arrangement, in which successive films are accumulated on a substrate surface (e.g., web while the substrate is in motion, and the accumulated film form a belt photoreceptor.

Specifically, the FIG. 5 embodiment includes a continuous substrate 525 (e.g., a web), the surface of which is fed past a series of stations, as is generally familiar in the art of film deposition, one station for each film to be deposited. For instance, to place a first film 526 on the substrate surface 525, there is used a film deposition station 514. For successive films, there is provided an equivalent station, such as 515, for a second film 527. The successive films are built up in a superimposed manner on the surface of the substrate 525 to form a portion of a final device (not shown). The film deposition process may be controlled, for example, by a deposition controller 510.

As is familiar in the art of continuous feed film deposition or roll-to-roll film deposition, by coordinating the activity of the deposition stations 514, 515 with the motion of the substrate surface 525 and other hardware (such as pulleys, feed-stock rollers, etc., not shown), the film deposition stations eject film material on the substrate surface 525 to create the desired film(s).

The sensing system 300 of the present disclosure (as shown in FIGS. 3A and 3B) can make measurements of films deposited on the substrate surface 425. In one embodiment, the sensing system 300 of the present disclosure (as shown in FIGS. 3A and 3B) may be placed in the film deposition system to directly monitor an incoming surface of a substrate, such as a web substrate, for example, at locations 558. The sensing system 300 of the present disclosure (as shown in FIGS. 3A and 3B) can be placed just after the deposition system stations 514 where a parameter, such as a color and/or thickness the first film 526 may be analyzed, for example, at locations 556. The sensing system 300 of the present disclosure (as shown in FIGS. 3A and 3B) can be placed just after the deposition system stations 515 where a parameter, such as a color and/or thickness the second film 527 may be analyzed, for example, at locations 552. There may be provided any number of sensing device placed anywhere in the deposition system as needed, not only in the locations illustrated.

The sensing devices 552, 556 and 558 provide feedback to a control device 510 for taking action in response to critical measurements taken. The information gathered therefrom is used by control device 510, which may control deposition stations 514 and 515 in various ways to aid in the operation of the deposition system, whether in a real-time feedback loop, an offline calibration process, a registration system, etc. While the control device 510 may include an on-board controller (not shown), or control device 510 and a corresponding controller (not shown) may be separate elements.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A system for providing spectral analysis with a spatially-resolved spectrophotometer, the system comprising:
   an illuminator positioned adjacent to a carrier having a surface, the illuminator being configured to emit light at a material disposed over the surface;
   a linear sensor positioned adjacent to the carrier, the linear sensor being configured to receive the light emitted from the illuminator and reflected off the material;
   a gradient index lens disposed between the carrier and the linear sensor, such that it is positioned in an optical path of the light emitted by the illuminator and reflected off the carrier's surface; and
   a micropatterned optical filter positioned between the linear sensor and the carrier,
   wherein the micropatterned optical filter is disposed directly on a light receiving portion of the linear sensor,
   wherein the micropatterned optical filter comprises a plurality of dichroic coatings stacked one over the other and disposed on a light receiving surface of the linear sensor, wherein each one of the plurality of dichroic coatings comprises a respective spectral transmittance, and
   wherein the system is devoid of a linear variable filter.

2. The system of claim 1, wherein the micropatterned optical filter comprises one or more of a metal coating, one or more of a conductive coating, or combinations thereof.

3. The system of claim 1, wherein the linear sensor comprises a plurality of sensor pixels, the micropatterned optical filter comprises a plurality of individualized micropatterned filters, and at least one of plurality of individualized filters is disposed over a corresponding one of the plurality of sensor pixels.

4. The system of claim 1, further comprising a processor, wherein the processor is configured to: i) determine color performance of an image printing system based on spectral response of the material received by the linear sensor, ii) adjust color performance of the image printing system based on spectral response of the material received by the linear sensor, or iii) both i and ii.

5. The system of claim 1, further comprising a processor, wherein the processor is configured to: i) determine deposition performance of a material deposition system based on spectral response of the material received by the linear sensor, ii) adjust deposition performance of the material deposition system based on spectral response of the material received by the linear sensor, or iii) both i and ii.

6. The system of claim 1, wherein the material comprises toner or ink.

7. The system of claim 1, wherein the linear sensor is configured in a process orientation relative to the carrier, a cross-process orientation relative to the carrier, or both a process and cross-process orientation relative to the carrier.

8. The system of claim 1, wherein each of the plurality of coatings comprises apertures.

9. A method for providing spectral analysis with a spatially-resolved spectrophotometer, the method comprising:
   configuring an illuminator to emit a light beam at a material disposed over a surface of a carrier, the illuminator being positioned adjacent to the carrier; and
   configuring a linear sensor to receive the light emitted from the illuminator and at least partially transmitted through a gradient index lens and a micropatterned optical filter,
   wherein the gradient index lens is disposed in an optical path of the light reflecting off the carrier's surface and is disposed inbetween the carrier's surface and the micropatterned optical filter, wherein the linear sensor is positioned adjacent to the carrier's surface, wherein the micropatterned optical filter is disposed between the linear sensor and the carrier, wherein the micropatterned optical filter is disposed directly on a light receiving portion of the linear sensor, wherein the micropatterned optical filter comprises a plurality of dichroic coatings stacked one over the other and disposed on a light receiving surface of the linear sensor, wherein each one of the plurality of dichroic coatings comprises a respective spectral transmittance, and wherein the light emitted by the illuminator and received by the sensor is not transmitted through a linear variable filter.

10. The method of claim 9, wherein the micropatterned optical filter comprises one or more metal coating, one or more of a conductive coating, or combinations thereof.

11. The method of claim 9, wherein the linear sensor comprises a plurality of sensor pixels, the micropatterned optical filter comprises a plurality of individualized filters, and at least one of plurality of individualized filters is disposed over a corresponding one of the plurality of sensor pixels.

12. The method of claim 9, further comprising configuring a processor, wherein the processor executes instructions to: i) determine color performance of an image printing system based on spectral response of the material received by the linear sensor, ii) adjust color performance of the image printing system based on spectral response of the material received by the linear sensor, or iii) both i and ii.

13. The method of claim 9, further comprising configuring a processor, wherein the processor executes instructions to: i) determine deposition performance of a material deposition system based on spectral response of the material received by the linear sensor, ii) adjust deposition performance of the material deposition system based on spectral response of the material received by the linear sensor, or iii) both i and ii.

14. The method of claim 9, further comprising configuring the linear sensor to receive the light emitted from the illuminator and at least partially transmitted through a gradient index lens, the gradient index lens disposed in an optical path of the light reflecting off the carrier's surface, and disposed in between the carrier's surface and a micropatterned optical filter.

15. The method of claim 9, further comprising moving the carrier in a process direction and configuring the linear sensor to receive the light in process orientation relative to the carrier, a cross-process orientation relative to the carrier, or both a process and cross-process direction.

16. The method of claim 9, wherein the material comprises toner or ink.

17. The method of claim 9, further comprising configuring a processor, wherein the processor executes instructions to adjust spatial TRCs, adjust a material jetting rate, turning one or more jets of an inkjet printhead on/off, or adjust a carrier feed rate.

18. The method of claim 9, wherein the micropatterned optical filter is positioned in an optical path of the light emitted by the illuminator and is positioned between the linear sensor and the carrier.

\* \* \* \* \*